Patented May 6, 1930

1,756,951

UNITED STATES PATENT OFFICE

KURT H. MEYER, OF MANNHEIM, JOHANNES MÜLLER, OF EPPSTEIN, AND ULRICH HOFFMANN, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRINTING COLORS

No Drawing. Application filed January 7, 1928, Serial No. 245,259, and in Germany January 7, 1927.

This invention relates to improvements in the production of printing colors, which expression is intended to include textile printing colors as well as copying and rotary printing colors, inks and the like, and carriers for such colors such as hectograph compositions, coloring rollers used in printing and the like.

We have found that excellent printing colors of the aforesaid nature are obtained by incorporating sorbitol which may also be employed in the form of its dehydration products, obtainable by splitting off water from sorbitol by heating, preferably under pressure and if desired in the presence of a dehydrating agent, according to the process of the application for patent Ser. No. 245,256, filed Jan. 7, 1928, or in the form of the products obtainable by the action of chemical agents on sorbitol or its said dehydration products, either alone or in admixture with one another. The incorporation of sorbitol or its aforementioned derivatives with gelatinous substances furnishes excellent carriers for such colors, in particular, hectograph compositions, coloring rollers for printing and the like.

In making up these preparations, sorbitol and its derivatives are usually employed in conjunction with a certain amount of water, and it is possible to obtain solutions of any desired viscosity by varying the amount of water added. Acetyl sorbitol in particular has such excellent thickening properties that dyestuffs and coloring matters, and also such as could not hitherto be printed, for lack of suitable thickening agents, can, when incorporated with acetyl sorbitol, be printed on textiles with ease. Also solutions or practically colloidal solutions of dyestuffs or coloring matters obtainable for example according to the process of U. S. Patent No. 1,589,700 may be printed on textiles when incorporated with acetyl sorbitol. Very good results are also obtained when acetyl sorbitol is employed in the usual process of calico printing, for example with vat dyestuffs, the shades of the imprints obtained being deeper and clearer. Considerable improvements are also observed in the printing of woolen goods with azo dyestuffs when acetyl sorbitol is added to the coloring matter.

Sorbitol and its derivatives have the effect of bringing dyestuffs and coloring matters into solution or into such a fine state of dispersion, that they are in a practically colloidal state. Because of this property very even printings are obtained with such dyestuffs, especially on textile fabrics, and the said printings often have a richer tone than those usually obtained.

On account of their hygroscopic properties, sorbitol and its derivatives are valuable constituents in the production of all sorts of inks, and in particular copying inks, stamp inks, hectograph inks and printers' colors and inks as employed in the graphic industry and also in the production of carriers for such colors, in particular of hectograph compositions, coloring rollers for printing and the like. Such compositions always remain moist, and the transfer of dyestuffs or coloring matters from one body to another in the printing process is thus very much facilitated.

In the production of all of the aforementioned compositions, printing colors, both for the textile and graphic industry, inks and the like, other substances having similar properties, such for example as glycol, glycerol, acetine, dextrin may be employed in conjunction with sorbitol or its derivatives.

Sorbitol and its derivatives moreover have the advantage of being readily available in any desired amount.

The following examples will further illustrate the nature of the said invention but the invention is not limited thereto. The parts are by weight except where otherwise stated.

Example 1

10 parts of a solution of sorbitol, of about 85 per cent strength, are mixed with 4 parts of glycerol. 10 parts of methyl violet N bluish are dissolved in 600 parts of this mixture, 200 parts by volume of water and 200 parts by volume of spirit being added. The product is an excellent ink for rubber stamp pads.

Example 2

An excellent ink for rubber pads is obtained by dissolving 10 parts of methyl violet B extra (highly concentrated brand) in a solution of 35 parts of sorbitol, 55 parts of water and 10 parts by volume of spirit.

The dehydration product of sorbitol obtainable according to the process of the aforesaid application for patent Ser. No. 245,256 may also be employed in the above example in place of sorbitol with a like good result.

Example 3

A mixture of 10 parts of methyl violet B extra (highly concentrated brand) with 45 parts of sorbitol is dissolved in 45 parts of water and 10 parts by volume of spirit. An excellent ink for rubber stamp pads is thus obtained.

The dehydration product of sorbitol may also be substituted for sorbitol as in Example 2.

Example 4

A good ink for rubber stamp pads is obtained by dissolving a mixture of 10 parts of methyl violet B extra (highly concentrated brand), 29 parts of sorbitol, 6 parts of mannitol in 55 parts of water and 10 parts by volume of spirit.

In the above example 35 parts of acetyl sorbitol may be employed in the place of sorbitol and mannitol.

Example 5

An excellent hectograph ink is obtained by mixing 10 parts of methyl violet N bluish and 20 parts of sorbitol with 5 parts of 6° Baumé acetic acid and 1000 parts of water.

Example 6

6 parts of methyl violet B extra (highly concentrated brand) are dissolved in a solution of 3 parts of dextrin, 5 parts of sorbitol, 2.5 parts of acetic acid of 30 per cent strength and 100 parts of water. An excellent hectograph ink is thus obtained.

Acetyl sorbitol or the dehydration product of sorbitol may be wholly or in part substituted for sorbitol in the above example with a like good result.

Example 7

A printing copying ink is prepared by mixing 10 parts of a 85 per cent solution of sorbitol with 2 parts of glycerol, and dissolving therein 0.1 part of zinc chlorid followed by 0.5 to 1.5 parts of methyl violet N bluish.

Example 8

A good copying ink is obtained by dissolving 2 parts of methyl violet B extra (highly concentrated brand) in a solution of 5 parts of dextrin and 2.5 parts of sorbitol in 100 parts of water.

The sorbitol may be replaced wholly or in part by the dehydration product thereof or by acetyl sorbitol with a like excellent result.

Example 9

A solution of 100 parts of gelatine and 30 parts of sorbitol in 400 parts of water furnishes an excellent hectograph mass on gelatinizing.

Example 10

An excellent hectograph composition is obtained from a solution of 100 parts of gelatine and 400 parts of the aforementioned dehydrated sorbitol in 250 parts of water and 50 parts of glycol.

Example 11

Equal parts of a scarlet lacquer obtainable from lithol fast scarlet RN (see Schultz-Farbstofftabellen 1914 No. 73) according to Example 4 of the U. S. Patent No. 1,589,700 and acetyl sorbitol are incorporated with one another. The viscous composition thus obtained is printed on cotton, dried and rinsed. A fast scarlet print is thus obtained.

If in the above example indanthren blue 2GSL powder (Schultz-Farbstofftabellen 1914 No. 841) is employed in place of lithol fast scarlet, a clear blue print is obtained, while when lamp black is substituted a greyish-black fast clear print is obtained.

Example 12

20 parts of a dyestuff, 60 parts of acetylated sorbitol and 50 parts of 6° Baumé acetic acid are dissolved in 140 parts of water by warming the same. A color well adapted for printing textiles is obtained. The relative proportions of the substances used may be varied within wide limits.

Example 13

100 parts of indanthren blue GCD (Color Index 1924 No. 1113) dyestuff paste are mixed with 150 parts of potash, 70 parts of water, 100 parts of acetyl sorbitol, 600 parts of starch-British gum thickening and 80 parts of sodium formaldehyde sulfoxylate. Calico goods are printed with this mixture in the usual way, and then steamed for 5 minutes in a Mather-Platt apparatus. The goods are then rinsed and soaped in the usual manner. Very clear imprints are obtained having a deep tone.

Example 14

30 parts of an azo dyestuff dyeing from an acid bath are mixed with 50 parts of acetyl sorbitol, 250 parts of water, 650 parts of British gum thickening (1:1) and 20 parts of oxalic acid or ammonium oxalate. Woollen goods are printed with this mixture, and steamed for an hour without the application of pressure. On being rinsed beautiful clear prints are obtained having a deep tone.

What we claim is:

1. As new compositions of matter printing colors comprising a coloring matter and sorbitol.

2. As new compositions of matter carriers for printing colors comprising a gelatinous substance and sorbitol.

3. As new compositions of matter printing colors comprising a coloring matter, sorbitol and a thickening agent.

4. As new compositions of matter printing colors comprising a vat dyestuff, sorbitol, a thickening agent and a reducing agent.

5. As new compositions of matter printing colors comprising a vat dyestuff, sorbitol, a thickening agent and sodium formaldehyde sulfoxylate.

In testimony whereof we have hereunto set our hands.

KURT H. MEYER.
JOHANNES MÜLLER.
ULRICH HOFFMANN.